Dec. 15, 1953     H. F. DAGUE     2,662,929
METHOD OF MANUFACTURING BATTERY SEPARATORS AND THE LIKE
Filed Aug. 23, 1952
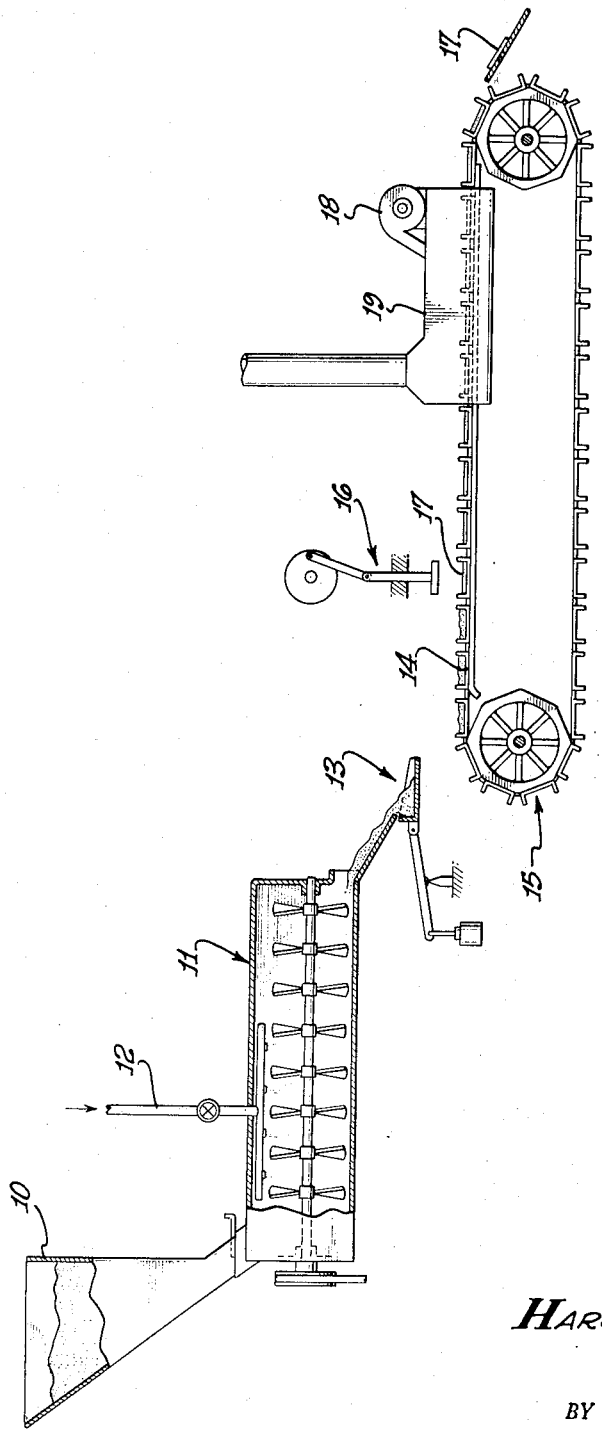
HAROLD F. DAGUE,
INVENTOR.
BY
ATTORNEY.

Patented Dec. 15, 1953

2,662,929

UNITED STATES PATENT OFFICE 2,662,929

METHOD OF MANUFACTURING BATTERY SEPARATORS AND THE LIKE

Harold F. Dague, Downey, Calif., assignor of one-third to William B. Collins, Inglewood, and one-third to Lee M. Caldwell, Long Beach, Calif.

Application August 23, 1952, Serial No. 306,067

4 Claims. (Cl. 136—148)

This invention relates to methods of making porous, acid resistant, homogeneous battery separators.

Those skilled in the art recognize that for years attempts have been made to make porous plates particularly adapted for use as separators in batteries such as the normal wet cells. Various materials have been employed, but none of them have answered all of the requirements imposed upon a separator by reason of the acid electrolyte, the fact that a portion of the plate is often exposed to air and is dry while other portions are wet, etc. Battery plate separators must be thin, strong, capable of resisting mechanical shock, capable of resisting temperature changes, the solvent effect of the acid, and maintain their form and shape under these strenuous conditions without curling, cracking or loss of porosity. It is essential that the electrolyte be capable of relatively free movement through the plates.

The present invention is directed to a method of making battery separators, and generally stated, comprises forming a thin film of liquid softening agent on the surface of globular solid particles of a polymerized resin and then compressing a predetermined quantity of such treated particles, while their surfaces are moistened with the treating agent and are tacky as a result of such treatment, the pressure employed during the compression being insufficient to crush the globular particles, but capable of deforming the contacting tacky surfaces to weld the particles at spaced points to each other and thereby form a lightweight porous, acid resistant and stable plate capable of being used as a battery separator and having many other adaptations.

It is an object of the present invention therefore to disclose and provide a simple and efficient method of producing homogeneous, porous, acid resisting and stable plates and other formed articles.

A further object of the invention is to disclose and provide a battery separator composed essentially of globular particles of polymerized resin bonded together by integral portions of such particles.

A still further object of the invention is to disclose and provide means, methods and modes of procedure whereby strong, stable and acid resistant battery separators and other objects may be readily manufactured.

These and various other objects, advantages and aspects of the present invention will become apparent to those skilled in the art from the following more detailed description of preferred modes of performing the improvements embraced by this invention and from the accompanying drawing.

The principal material utilized in the manufacture of the porous plates is a polymerized thermoplastic resin in the form of globular particles or beads. Styrene and polystyrene resin as well as the acrylic resins are best suited for use in this invention by reason of the strength of the resins, their relatively low coefficient of thermal expansion, absence of water absorptive characteristics, etc., although polyethylene resins, of sufficiently high molecular weight to have the desired strength and rigidity can also be used.

These thermoplastic resins are produced in the form of minute beads by the emulsion method whereby, for example, a monomeric styrene is emulsified in an aqueous medium to form fine particles of spheres of monomeric styrene dispersed in the liquid. This emulsion or dispersion is then polymerized in order to form polystyrene beads and such beads are then precipitated and removed from the dispersion. It has been found that beads passing a 20 mesh sieve and remaining on an 80 mesh sieve are extremely well adapted for use in the production of very porous plates. It is not necessary that all of the resin be in the form of beads coming within this particular range of sizes since small amounts of beads passing through a 100 mesh sieve and small amounts even larger than 20 mesh may be present without deleterious effect. The beads employed, however, should not be classified in a manner similar to that of a dense concrete aggregate since it is desirable that the major portion of the beads come within a relatively narrow range in size in order to produce a greater volume of interstitial spaces when the beads are compressed into a relatively compact mass. It will be understood that variation in particle sizes results in differences in bulk density. Polystyrene beads capable of being procured on the open market from the Koppers Company and successfully used in the process of this invention have varied from approximately 37 to 41 lbs. per cubic foot in bulk. The specific gravity of the polystyrene is about 1.06.

In the schematic representation of the process for manufacturing separator plates, appended hereto, there is shown a mass or moving stream of such solid globular particles of a polystyrene resin delivered from a storage hopper 10. The globular particles or granules of polystyrene or similar resin are fed to a mixer or blender 11 provided with agitating and propelling means and are now contacted with a very small amount of a liquid softening agent sprayed over the mass of globular particles in mixer 11 by a solvent spraying means 12 in such manner as to form a thin film (which may be discontinuous) on the surfaces of the particles. Since only 1% to about 5% of such liquid softening agent, by weight of resin particles, is normally required and it is difficult to uniformly distribute such small amount of softening agent over the large surface area of particles, it has been found desirable to use a mixture of liquid softening agent and a liquid carrier.

As liquid softening agent any solvent capable of attacking the beads may be used; numerous aromatics such as toluene, xylene, etc., chlorinated solvents such as carbon tetrachloride and ethylene dichloride, ketones such as acetone, methyl ethyl ketone, methyl isobutyl ketone, hydrocarbon distillates such as heptane, and solvents such as ethyl acetate, may be used. The equipment used in distributing the solvent upon the beads, the time of contact desired or available in continuous operation, and other factors may influence the selection of a softening agent, since some are more active than others and some may evaporate before the mass is subsequently compressed; the wide range of softening agents permits selection of the one which fits existing conditions and produces beads provided with a slightly softened, tacky surface at the time the particles are compressed into plates.

The liquid carrier is preferably not a solvent for the resin and may be more volatile than the softening agent; it may be aqueous and form an emulsion with the softening agent or it may be miscible with the agent and comprise an alcohol, such as ethyl, methyl, isopropyl, etc. The softening agent (either alone or with a carrier) is preferably sprayed upon the beads moving through a blender or mixer. Ordinarily a mixture of 50% to 80% of a carrier with 50% to 20% of the softening agent is effective; about 3% to 10% of such mixture by weight of the resin particles is sufficient to adequately wet the particles and produce the desired tacky surface condition. In no event should sufficient softening agent be used to render the entire particles soft or deformable.

Mixing, blending and contact of the beads with the softening agent is carried out until the surface of the beads is tacky and preferably the carrier has evaporated, whereupon the mixture is fed through a proportioning feeder 13, and each predetermined and desired volume of the treated beads is then fed into any suitable type of forming or molding press such as a compression molding press wherein such predetermined volume of beads is compressed to a plate of desired contour, size and thickness. For example, the treated beads may be fed into a compartment 14 of a series carried by a conveyor 15, such beads being compressed by head or ram 16 to form a plate 17. Or long sheets or strips may be formed by compressing the beads between rolls and such strips then cut to form plates of desired size. In commercial operation it has been found that the blending and surface softening action may be attained in a period of one and one-half to three minutes; the compression or molding of the material into the desired plates can be carried out immediately thereafter or at any time before the surface of the particles again becomes hard. Molding or pressing can be accomplished within a very short period of time, of say, one to five seconds, and pressures of 4,000 lbs. to 10,000 lbs. per square inch may be used. In no event should the pressure be sufficient to actually crush the beads; the pressure should only be sufficient to cause the tacky, softened surfaces of the particles to become welded to each other without sufficient deformation or flowing of the surface to fill up the interstices between the particles.

The resulting plates or battery separators will vary in size and contour, depending upon the batteries in which they are to be used. Thicknesses of from about $\frac{1}{16}$ in. to $\frac{1}{8}$ in. have been employed.

It may be noted that after molding, any residual solvent or carrier may be removed by drying the molded plates. The freshly molded plates may, for example, be subjected to a blast of heated air; from a blower 18 while the plates are passing through an oven 19; this permits the removal of the solvents in ten to twenty seconds.

It has also been found desirable, in some instances, to treat the plates with a surface-active agent in order to facilitate permeation of the plates with electrolytes in actual use. Such surface-active agents, preferably of the non-ionic type, may be incorporated in the mixture of liquid-softening agent and carrier in quantities of 0.2 to 0.3% by weight of the liquid mixture. Non-ionic agents, preferably of a water-soluble type, such as partial esters of polymerized glycerol, hydroxyalkyl ethers of glycerol, sorbitol, mannitol, esters of long chain polyethylene glycol, etc., are well adapted for use in the method of this invention. It appears that these surface-active agents are left on the surfaces of the beads from which the final plate or product is composed and the passage of electrolytes and other liquids through the plates is facilitated.

The control of the amount of softening agent employed may be attained by periodically checking the resistance of the plates to the passage of water therethrough. A test plate having a one inch diameter and $\frac{1}{8}$ in. thick may be attached to the bottom of a 100 cc. graduated cylinder and 100 cc. water at 70° F. should flow through the plate in less than thirty seconds. If a longer time is required, then an excessive amount of softening agent is being employed.

It is to be noted that the finished plates or articles are provided with surfaces corresponding in contour, shape and finish to those of the die cavity used in the compression press. Interstitial pores of the plate extend continuously from one surface of the finished article to the other, and such pores form unobstructed channels to the passage of liquids and gases. Such pores are not surface clogged, nor do they contain fine, dust-like particles which may cause plugging. The molded or compressed plates have ample strength (both compressive and in shear) to withstand shipment, handling, etc. and do not lose strength in use.

It will be evident from the description given hereinabove that this invention provides a ready and simple method of making homogeneous, porous, acid-resisting and stable plates and other formed articles, the plates being particularly adapted for use as battery separators or partitions. All modifications and changes coming within the scope of the appended claims are embraced thereby.

I claim:

1. A method of making porous, acid-resistant and homogeneous articles, adapted for use as battery separators and the like, which comprises: contacting a moving stream of solid, gobular particles of a polymerized resin with from about 0.75% to about 5% of a liquid softening agent by weight of the resin particles for a time sufficient to impart tackiness to said surfaces; and compressing a predetermined quantity of said treated particles, while their surfaces are tacky, to deform contacting surfaces of said particles and without crushing said particles, to form a porous article of desired contour and thickness.

2. A method of the character stated in claim 1, wherein the globular particles are of polymerized styrene and not less than 80% thereof by weight are of a size adapted to pass a 20 mesh and be retained on a 60 mesh sieve.

3. A method of the character stated in claim 1, wherein the solid particles are contacted with a mixture of liquid softening agent and a liquid carrier.

4. A method of the character stated in claim 1, wherein the solid particles are contacted with a mixture of liquid softening agent and a surface-active agent.

HAROLD F. DAGUE.

References Cited in the file of this patent

UNITED STATES PATENTS

| Number | Name | Date |
|---|---|---|
| 2,291,079 | Hofferbert | July 28, 1942 |
| 2,297,248 | Rudolph | Sept. 29, 1942 |
| 2,371,868 | Berg et al. | Mar. 20, 1945 |